2,983,617
CHOCOLATE CHIFFON

Harry W. Block, Orange, N.J., assignor to General Foods Corporation, White Plains, N.Y., a corporation of Delaware No Drawing. Filed Oct. 30, 1958, Ser. No. 770,585

8 Claims. (Cl. 99—139)

This invention relates to a new whipping composition for use as a chocolate chiffon food product or pie filling.

Chiffon, when employed as a flavored dessert product such as pie filling, should evidence a high degree of overrun, good peaking, and fineness and uniformity of aerated cellular structure. Chiffon, as distinguished from other high solids whips such as marshmallow, is characteristically composed of solids in the order of 30–40% and is considered a low solids content whip when compared with crème whips, for example, which exhibit a much heavier viscous texture. As an example of the distinction between the two types of whips the use of various gummy materials, such as Irish moss and carboxymethyl cellulose which offer stability to a high solids sugar whip, is not considered desirable in chiffon type whips because of the need for a delicate, reticular, aerated structure, which chiffon whips in fact are more of the nature of a foam system. Chiffon, in addition, is characterized as having a uniform non-tacky separation or cleavage when sectioned into wedges or slices. When viewed in cross section, a cut of chiffon should exhibit a fine capillary network of uniformly arranged cells of delicate texture. Therefore, it is seen that the light foamy texture of chiffon is not essential to high density cohesive whips, such as crèmes or frappé products, and the problem of foam stability found in chiffons is not as critical in whips having a more dense and viscous composition.

In the formulation of a chocolate type chiffon the addition of a cocoa flavoring agent to the whip to impart the necessary chocolate flavor gives rise to a suppression of the foam with the resultant instability and destruction of the fine cellular network so essential to the formation of a light delicately frothy material capable of being readily sectioned into wedges without cohesion. This suppression of froth formation in chiffon mixes containing cocoa may be compensated for by the addition of two to three times the normal amount of gelatin employed. However, gelatin is quite expensive and causes an increase in the effort required to obtain a satisfactory whip as well as increase in the beating time necessary to achieve an acceptable chiffon, and moreover, increases the cost of the product.

It is an object of the present invention to provide a less costly composition for chocolate chiffon which can be whipped to produce a satisfactory stable product exhibiting the characteristic delicate reticular network of cells without any increase in effort or time of whip to yield a chocolate chiffon of acceptable quality.

In accordance with the present invention a new whipping composition for the production of chocolate chiffon possessing a stable delicate foamy structure, capable of being whipped in a short time with a minimum amount of effort, and which avoids the use of massive quantities of either a gelatin setting agent or protein foam former is provided. The present invention is based on the discovery that a particular class of mannolactan gums, the best known being guar gum, a polysaccharide hydrolyzate containing the hexoses, mannose and galactose, when added to a chocolate chiffon whipping composition, otherwise subject to foam depression and instability, will stabilize and support said foam system without increasing the time or effort needed for whipping. The whipped foam so produced exhibits a high degree of overrun and delicate reticular texture characteristic of a stable and entirely satisfactory chiffon. The chocolate chiffon can be provided at a great saving in the cost of the ingredients due to a reduction in the level of gelatin and hydrolyzed soy protein required.

The invention preferably comprises compounding guar gum with cocoa powder, gelatin, partially degraded soy protein, and a sugar. Most preferably, dried pregelatinized starch is also added to the composition to aid stabilization. In addition, a phosphorus-containing compound selected from the group consisting of phosphates, phytates, acids and acid salts thereof is also employed since it endows the partially degraded soy protein and the gelatin with superior whipping and setting properties; typically, the phosphorus-containing compounds may be an alkali metal polyphosphate, orthophosphate, pyrophosphate, and the like, the more preferred phosphate being the alkali metal hexametaphosphate and the phosphate glass known as Graham's salt. In the case of the phytates, the alkali metal phytates may be employed, i.e., the hexaphosphoric ester salts of inositol; salts representative of the phytates are sodium phytate and calcium phytate.

The cocoa powder used in the present composition is that derived from the operation of roasting cacao beans and grinding and expressing from the beans cocoa butter to yield a cocoa press cake having a fat content less than 20%, and more particularly, a butter fat content ranging from 12–14%. The cocoa powder is derived by grinding the press cake to a fine powder.

By virtue of the employment of guar gum in combination with the gelatin and the partially degraded soy protein, it has been found that the tendency of the fatty constituents of cocoa powder to suppress foam development and lead to foam separation is arrested to the extent that the level of gelatin and hydrolyzed soy protein which would ordinarily be required in the absence of guar gum can be reduced considerably.

Both high and low bloom gelatin may be employed as well as substituted gelatins. The level of gelatin which would normally be employed in compounding the present composition will vary depending upon the bloom of the gelatin, the higher bloom gelatins being required at a generally lower level. For the purposes of the present invention gelatin having a Bloom Strength of 150–250 and preferably 180–220 units is desired.

The partially degraded soy protein may be obtained by the acid, alkali, or enzyme digestion of proteinaceous extracts of soy bean. For the purposes of the present invention it is preferred that the hydrolyzate of soy protein be enzymatically partially degraded so as to contain polypeptides, oligopeptides, and amino acids. For the purposes of the present invention soy protein which has been enzymatically hydrolyzed with pepsin to from 10–18% is preferred, although trypsin and pancreatin have been successfully employed. A typical soy proteinaceous whipping agent and the analysis thereof is as follows:

| | | |
|---|---|---|
| Total nitrogen | percent | 9.9 |
| Amino nitrogen | do | 1.1 |
| Ash | do | 13.4 |
| Moisture | do | 4.6 |
| pH (1% solution) | | 5.5 |

Total nitrogen is determined by the Kjeldahl method and amino nitrogen is determined by the method described by David M. Breenberg in "Amino Acids and Proteins," published by Charles C. Thomas, Springfield, Illinois, 1951, on pages 80, 81, and 246.

Example I

The preferred range of proportions of ingredients in the present composition is as follows:

| Ingredients: | Parts/Weight (gms.) |
|---|---|
| Sugar | 50–70 |
| Cocoa powder | 5–15 |
| Gelatin | 3–6 |
| Partially degraded soy protein | 3–10 |
| Dried pregelatinized starch | 1–8 |
| Graham's salt (sodium polymetaphosphate) | .5–1 |
| Guar gum | .16–.40 |

The function of the cocoa utilized in this invention is to impart chocolate flavor and natural color to the product. However, the level of cocoa necessary to give chocolate chiffon the proper flavor ordinarily destroys chiffon product stability and lengthens the whipping time and effort necessary when such product is prepared with homogenized or non-homogenized milk. The partially hydrolyzed soy protein employed provides the aeration and foam volume needed for chiffon texture. Its role is primarily that of a whipping agent. Decreased levels of hydrolyzed soy protein tend to considerably lengthen the whipping time necessary to achieve a satisfactory chiffon whip. The function of gelatin in the formulation is twofold. It imparts to the product a desirable stiff consistency for good eating quality as well as preventing syneresis of the chiffon at elevated room temperatures. The dried pregelatinized starch is included in the formula to act as a binder for the foam system and prevent separation of the ingredients prior to refrigeration. Moreover, the presence of dried pregelatinized starch supplies the necessary body for the product which yields a sensation of fullness as chiffon is consumed. Preferably the starch component will not contain more than 7% moisture. The role of Graham's salt in the formula is to decrease the whipping time of the product as well as aiding in the prevention of breakdown of the chiffon. Sugar, such as dextrose, sucrose, maltose, levulose, lactose, and fructose, provides the sweetness desired to round off the chocolate flavor. Saccharide mixtures such as dry corn syrup solids may also be employed, although the sweetening agent preferred is dextrose.

Guar gum employed in quantities less than one part by weight acts as a stabilizing agent for the system. It appears to preserve the delicate reticular network of cells formed in the chiffon whip and prevent collapse of said cellular network. It has been found that the guar gum level which is critical should not be less than .16 gram nor more than .40 gram per package to obtain an acceptable product. At values below .16 the chiffon has too low a density and suffers in consistency. Above .40 gram the density of the final whipped foam is too high to yield a satisfactory chiffon.

The invention is illustrated by the following example:

Example II

A chocolate chiffon was prepared from the following ingredients which are simply dry blended together.

| Ingredients: | Parts/weight (gms.) |
|---|---|
| Dextrose | 59.72 |
| Cocoa powder | 8.20 |
| Partially degraded soy protein | 6.20 |
| Gelatin | 4.50 |
| Dried pregelatinized starch | 2.63 |
| Flavor | 1.80 |
| Chocolate color | 1.08 |
| Graham's salt (sodium polymetaphosphate) | 0.60 |
| Guar gum | 0.32 |

The above dry blended ingredients are placed in a large deep mixing bowl and one-half cup boiling water or milk is then added and the ingredients hydrated by thorough mixing. One-half cup cold water is then added and beating conducted at high speed in an electric mixer is carried out for about one minute or until the product is very foamy. Addition of one-third cup sugar then follows and the product is beaten for one to three minutes until the filling stands in peaks. The mixture is then poured into a cooled baked eight-inch shell and chilled in the refrigerator for two hours until the gel is set. The chocolate chiffon so prepared has a reticulate consistency, is not rubbery when cooled, and exhibits a rich chocolate flavor as well as the delicate foam quality of chiffon.

It will be understood that while the invention has been described in part by means of specific examples, reference should be had to the appended claims for a definition of the scope of the invention.

What is claimed is:

1. A composition for preparing chocolate chiffon which comprises cocoa powder, partially degraded soy protein, gelatin, guar gum, and sugar.

2. A composition for preparing chocolate chiffon which comprises in combination cocoa powder, partially degraded soy protein, gelatin, guar gum, sugar, and dried pregelatinized starch.

3. A composition for preparing chocolate chiffon which comprises in combination cocoa powder, partially degraded soy protein, gelatin, guar gum, sugar, and a phosphorus-containing compound selected from the group consisting of phosphates, phytates, and acids and acid salts thereof.

4. A composition for preparing chocolate chiffon which comprises in combination cocoa powder, partially degraded soy protein, gelatin, guar gum, sugar, dried pregelatinized starch, and a phosphorus-containing compound selected from the group consisting of phosphates, phytates, and acids and acid salts thereof.

5. A composition comprising the following ingredients in parts by weight:

| Sugar | 50–70 |
|---|---|
| Cocoa powder | 5–10 |
| Partially degraded soy protein | 5–7 |
| Gelatin | 4–5 |
| Guar gum | 0.16–0.40 |

6. A stabilized chocolate chiffon mix comprising in parts by weight:

| Sugar | 50–70 |
|---|---|
| Cocoa powder | 5–10 |
| Partially degraded soy protein | 5–7 |
| Gelatin | 4–5 |
| Guar gum | 0.16–0.40 |

7. A stabilized chocolate chiffon mix comprising in parts by weight:

| Sugar | 50–70 |
|---|---|
| Cocoa powder | 5–10 |
| Partially degraded soy protein | 5–7 |
| Gelatin | 4–5 |
| Guar gum | 0.16–0.40 |
| Dried pregelatinized starch | 2–4 |

8. A stabilized chocolate chiffon mix comprising in parts by weight:

| Sugar | 50–70 |
|---|---|
| Cocoa powder | 5–10 |
| Partially degraded soy protein | 5–7 |
| Gelatin | 4–5 |
| Guar gum | 0.16–0.40 |
| Dried pregelatinized starch | 2–4 |
| Graham's salt (polymetaphosphate) | 0.10–0.60 |

References Cited in the file of this patent

UNITED STATES PATENTS

| 2,444,241 | Beckel et al. | June 29, 1948 |
|---|---|---|
| 2,502,397 | Werbin | Mar. 28, 1950 |
| 2,844,468 | Gunther | July 22, 1958 |

OTHER REFERENCES

"Everybody's Cookbook" by Lord, Revised Edition, Harcourt, Brace and Company, New York, page 801.